United States Patent
O'Callaghan et al.

(10) Patent No.: US 12,392,338 B2
(45) Date of Patent: Aug. 19, 2025

(54) SELF-RECHARGING STAND-ALONE MONITORING SYSTEM

(71) Applicant: Cornell Pump Company LLC, Clackamas, OR (US)

(72) Inventors: Colin O'Callaghan, Portland, OR (US); Adam Lindeman, Oregon City, OR (US); Erick Johnson, Gresham, OR (US); William James Warren, Boring, OR (US)

(73) Assignee: Cornell Pump Company LLC, Clackamas, OR (US)

( * ) Notice: Subject to any disclaimer, the term of this patent is extended or adjusted under 35 U.S.C. 154(b) by 49 days.

(21) Appl. No.: 18/165,741

(22) Filed: Feb. 7, 2023

(65) Prior Publication Data
US 2023/0250818 A1    Aug. 10, 2023

Related U.S. Application Data

(60) Provisional application No. 63/308,735, filed on Feb. 10, 2022.

(51) Int. Cl.
*F04B 51/00* (2006.01)
*H02S 20/30* (2014.01)
*H02S 40/38* (2014.01)

(52) U.S. Cl.
CPC .............. *F04B 51/00* (2013.01); *H02S 20/30* (2014.12); *H02S 40/38* (2014.12); *F04B 2203/0206* (2013.01); *F04B 2205/09* (2013.01); *F04B 2207/702* (2013.01)

(58) Field of Classification Search
CPC ..... F04B 17/006; F04B 51/00; H02J 2300/22; H02J 2300/24
USPC ........................................................ 280/651
See application file for complete search history.

(56) References Cited

U.S. PATENT DOCUMENTS

| | | | |
|---|---|---|---|
| 5,405,086 A * | 4/1995 | Kranzle | ................. B08B 3/026 239/310 |
| 10,178,449 B1 | 1/2019 | Struhsaker | |
| 10,477,395 B2 | 11/2019 | Bahrami et al. | |
| 10,865,155 B2 | 12/2020 | Do | |

(Continued)

FOREIGN PATENT DOCUMENTS

| | | | |
|---|---|---|---|
| CN | 106020088 A | | 10/2016 |
| CN | 206190465 U | * | 5/2017 |

OTHER PUBLICATIONS

Liu, 'Mobile Photovoltaic Water Pump'—CN 206190465 Machine Translation (Year: 2016).*

(Continued)

*Primary Examiner* — Kenneth J Hansen
(74) *Attorney, Agent, or Firm* — Fish & Richardson P.C.

(57) ABSTRACT

A device for monitoring pump equipment may include a pump monitoring device comprising sensor devices configured to monitor the pump equipment, a controller configured to configure the sensor devices and collect sensor data from the sensor devices, and a wireless transceiver configured to communicate with a cellular base station. The device may further include a battery configured to provide power to the pump monitoring device; a solar panel; a charging system to charge the battery using the solar panel; and a chassis configured to secure the pump monitoring system, battery, solar panel, and charging system into a self-contained mobile monitoring device.

17 Claims, 11 Drawing Sheets

(56) References Cited

U.S. PATENT DOCUMENTS

| | | | |
|---|---|---|---|
| 2006/0078435 A1 | 4/2006 | Burza | |
| 2007/0210236 A1* | 9/2007 | Yungner | B60P 3/14 |
| | | | 248/678 |
| 2010/0109601 A1 | 5/2010 | Coyle et al. | |
| 2013/0192332 A1* | 8/2013 | Scheffler | G01N 33/007 |
| | | | 73/1.06 |
| 2013/0255665 A1* | 10/2013 | Nickel | F24S 10/45 |
| | | | 126/595 |
| 2013/0310631 A1* | 11/2013 | Lee | G06F 1/3218 |
| | | | 600/16 |
| 2015/0226805 A1 | 8/2015 | Albers et al. | |
| 2019/0203578 A1 | 7/2019 | Hecht et al. | |
| 2019/0335688 A1 | 11/2019 | Tirupathi et al. | |
| 2020/0131893 A1* | 4/2020 | McCreery | B65H 75/425 |
| 2020/0242855 A1 | 7/2020 | Sandu et al. | |
| 2022/0135317 A1* | 5/2022 | Pulak | F04B 23/02 |
| | | | 222/64 |

OTHER PUBLICATIONS

Meah, K. et al., "Solar photovoltaic water pumping for remote locations", Renewable and Sustainable Energy Reviews, vol. 12, Issue 2, Feb. 2008, pp. 472-487.

* cited by examiner

SELF-RECHARGING STAND-ALONE MONITORING SYSTEM

CROSS-REFERENCE TO RELATED APPLICATIONS

This application claims priority under 35 U.S.C. § 119, based on U.S. Provisional Application No. 63/308,735, filed Feb. 10, 2022, the disclosure of which is incorporated by reference herein.

BACKGROUND OF THE INVENTION

A pump system may be installed in a remote and/or temporary location. Examples of such systems include systems for hydraulic fracturing for oil extraction or pumps for municipal wastewater bypass systems. Such pump systems often require tracking of system conditions and are not in proximity to an available power source. As a result, a large and power-hungry monitoring system may need to be connected to a nearby generator, requiring significant installation effort and regular local maintenance, in order to keep track of conditions and adjust pumps appropriately based on the conditions. Thus, monitoring a pump system in a remote location presents various challenges.

DETAILED DESCRIPTION OF THE PREFERRED EMBODIMENTS

Figure 1:
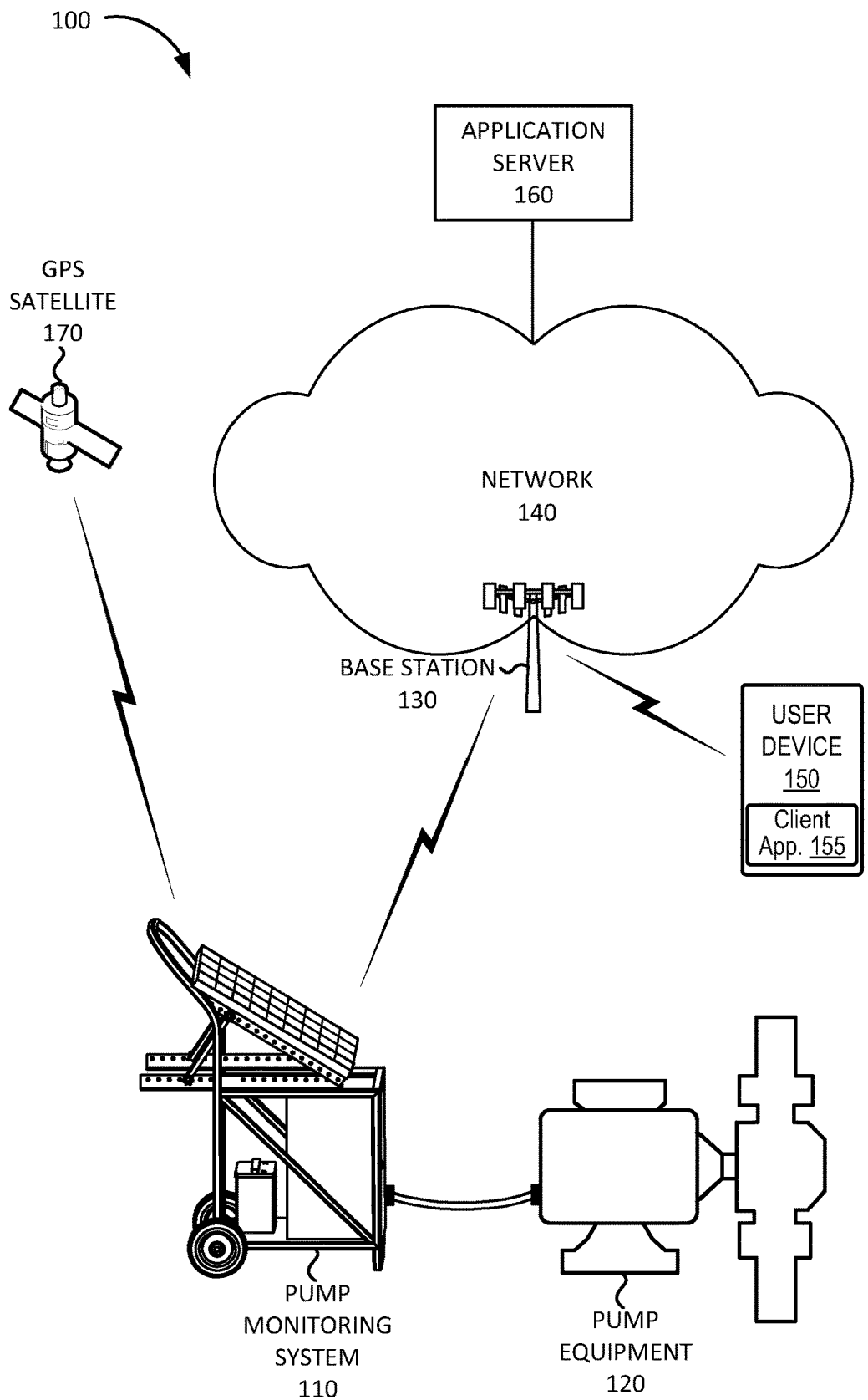
FIG. 1 is a diagram of a network environment in which systems and methods described here may be implemented.

The following detailed description refers to the accompanying drawings. The same reference numbers in different drawings may identify the same or similar elements. Also, the following detailed description does not limit the invention.

Implementations described herein relate to systems and methods of pump monitoring using a self-charging, self-contained mobile pump monitoring system. A system for monitoring pump equipment may include a pump monitoring device that includes a set of sensor devices configured to monitor pump equipment, and/or includes a set of interfaces for coupling to one or more sensor devices installed and/or attached to the pump equipment. The sensor devices may include, for example, a flow meter, a fluid level meter, a vibration sensor, a temperature sensor, a pressure sensor, and/or another type of sensor.

The pump monitoring device may further include a controller to configure the sensor devices and collect sensor data from the sensor devices and a wireless transceiver configured to communicate with a cellular base station to report the collected sensor data to another device, such as an application server. The system may further include a battery configured to provide power to the pump monitoring device, a solar panel, and a charging system to charge the battery using the solar panel. The charging system may be configured to use power from the battery to power the pump monitoring device, when the battery power is above a battery power threshold, and use power from the solar panel to power the pump monitoring device and/or charge the battery, when the battery is associated with a battery power below the battery power threshold.

The system may also include a chassis configured to secure the pump monitoring device, battery, solar panel, and charging system into a self-contained mobile monitoring system. The chassis may include a cart with wheels and a handle for ease of transport over uneven ground to a remote location. For example, the cart may include a pair of wheels on one side and a bar on the other side to keep the cart level when not in motion. Furthermore, the solar panel may be secured to the chassis in a position that protects the solar panel from impact if the chassis tips over.

The controller may be configured to receive selection of one or more of the sensors to use to collect sensor data, obtain a sensor configuration for the selected one or more sensors, configure the selected one or more sensors based on the obtained sensor configuration, collect sensor data based on the obtained sensor configuration, and report the collected sensor data via the wireless transceiver. The sensor configuration may include, for example, a calibration process to perform, a range of sensor values over which to gather sensor data, a threshold sensor value to generate an alert, a pulse generation parameter for generating a pulse to gather sensor data, and/or another type of sensor configuration.

For example, the controller may be configured to set a threshold sensor value for a sensor, detect that the threshold has been reached or exceeded via data collected from the sensor, generate an alert based on the detected threshold sensor value, and transmit the generated alert to an application server, or to another device/system, using the wireless transceiver.

In some implementations, the system may include additional features, such as a foot brake to engage the wheels and secure the wheels in place when the cart is not in motion, a protective frame around the solar panel to protect from impact damage, one or more cable hooks to facilitate management of cables between the pump equipment and the monitoring device, and/or one or more mounting assemblies for an antenna for the wireless receiver, an antenna for a Global Position System (GPS) receiver, and/or another type of antenna, as described in detail below.

FIG. 1 is a diagram illustrating an exemplary environment 100 in which systems and/or methods described herein may be implemented. As illustrated, environment 100 may include a pump monitoring system 110, a pump equipment 120, a base station 130, a network 140, a user device 150 that includes a client application 155, an application server 160, and a GPS satellite 170.

Pump monitoring system 110 may monitor pump equipment 120. Pump monitoring system 110 may include a self-charging, self-contained mobile pump monitoring system. Pump monitoring system 110 include a chassis, such as a metal cart with wheels, that houses a pump monitoring device, a battery, a charging system, and a solar panel. The pump monitoring device may include a controller, a set of sensors and/or sensor interfaces, a wireless transceiver configured to communicate with base station 130 using cellular wireless signals, and/or a GPS receiver to determine a location of pump monitoring system 110 based on signals received from one or more GPS satellites 170. Pump monitoring system 110 may receive instructions from application server 160 and/or user device 150 to configure one or more sensor to collect sensor data for pump equipment 120 and report the collected sensor data to application server 170 and/or user device 150.

Pump equipment 120 may include pumps, electric motors, and/or other types of rotating equipment for moving fluid, for example, through a conduit, such as a pipe, moving fluid into or out of a storage or holding tank, pumping fluid out of or into the ground, and/or otherwise move fluid. In some implementations, pump equipment 120 may include one or more sensors installed in and/or on pump equipment 120 and pump monitoring system 110 may include one or more sensor interfaces that may be coupled to the installed sensors using wired and/or wireless connections. Additionally, or alternatively, pump monitoring system 110 may include one or more movable sensors that may be stored on the chassis of pump monitoring system 110 and attached to pump equipment 120, and/or otherwise interface with pump equipment 120, to collect sensor data relating to operation of pump equipment 120, when pump monitoring system 110 is moved into location.

Base station 130 may include a cellular wireless base station, such as a Fifth Generation (5G) New Radio (NR) base station (e.g., a gNodeB), a Fourth Generation (4G) Long Term Evolution (LTE) base station (e.g., an eNodeB), or a base station associated with another generation (e.g., Third Generation (3G), etc.). Base station 130 may include a radio frequency (RF) transceiver configured to communicate with user equipment (UE) devices attached to base station 130, such as user device 150. Furthermore, a wireless transceiver in pump monitoring system 110 may attach to base station 130 as a UE device. Base station 130 may enable connection to network 140. In some implementations, pump monitoring system 110 may communicate with base station 130 using a machine-to-machine (M2M) communication method, such as, for example, Machine Type Communication (MTC), enhanced MTC communication (eMTC) (also known as Cat-M1), a Low Power Wide Area (LPWA) technology such as Narrow Band (NB) Internet of Things (NB-IoT) technology, and/or another type of M2M communication method.

Network 140 may include one or more wired, wireless and/or optical networks that are capable of receiving and transmitting data, voice and/or video signals. For example, network 140 may include a Radio Access Network (RAN) and/or a core network associated with the RAN (e.g., a 4G core network, a 5G core network, etc.), an Internet Protocol (IP) multimedia subsystem (IMS) network, a Multi-Access Edge Computing (MEC) network, a local area network (LAN), a wide area network (WAN), a personal area network (PAN) (e.g., a wireless PAN (WPAN)), a wireless local area network (WLAN), an intranet, the Internet, a satellite network, a metropolitan area network (MAN), an autonomous system (AS) on the Internet, an optical network, a satellite network, and/or another type of packet switched network or circuit-switched network that is capable of transmitting data from pump monitoring system 110 to other devices, such as user device 150 and/or application server 160.

User device 150 includes a device that has computational and cellular wireless communication capabilities. User device 150 may attach to base station 130 as a UE device. User device 150 may be implemented as a mobile device, a portable device, a stationary device, a device operated by a user, or a device not operated by a user. For example, user device 150 may be implemented as hand-held mobile wireless communication device (e.g., a smartphone), a computer, a tablet, a wearable device, or some other type of wireless communication device. User device 150 may include client application (or "app") 155. Client application 155 may be programmed/configured to connect to pump monitoring system 110 and provide instructions to pump monitoring system 110 and/or receive sensor data from pump monitoring system 110. Additionally, or alternatively, client application 155 may enable a user, such as a party associated with monitoring the operation of pump equipment 120, to connect to application server 160 to provide instructions to pump monitoring system 110 and/or receive sensor data from pump monitoring system 110.

Application server 160 may include one or more computer devices, such as server devices, configured to connect to pump monitoring system 110 and provide instructions to pump monitoring system 110 and/or receive sensor data from pump monitoring system 110. According to an implementation, application server 160 may use one or more Application Programming Interfaces (APIs) to enable users send and/or receive data from pump monitoring system 110.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100. For example, while FIG. 1 illustrates a single pump monitoring system 110, pump equipment 120, base station 130, network 140, user device 150, application server 160, and/or GPS satellite 170 for illustrative purposes, in practice, environment 100 may include multiple pump monitoring systems 110, pump equipment 120, base stations 130, networks 140, user devices 150, application servers 160, and/or GPS satellites 170.

Figure 2:
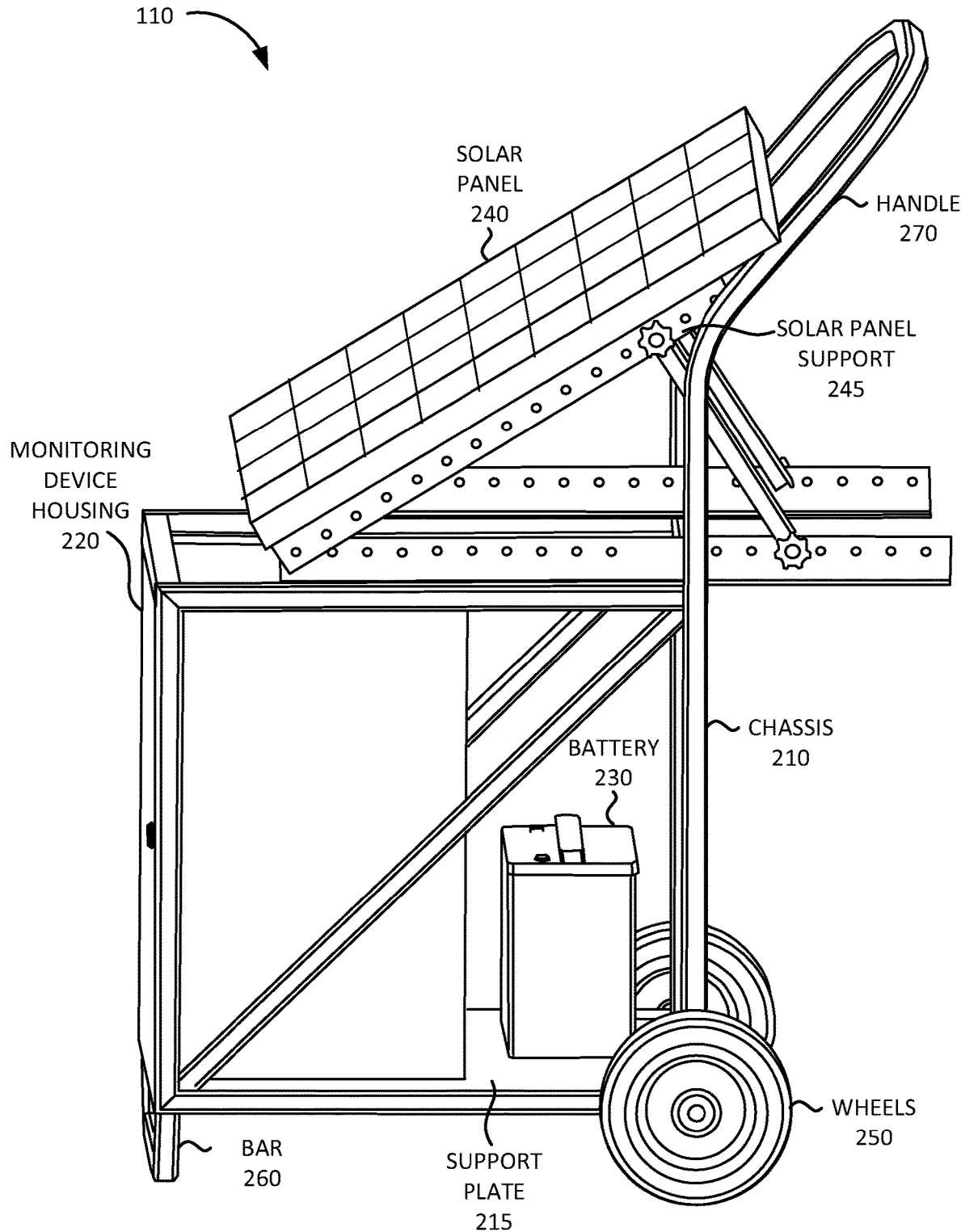
FIG. 2 is a diagram of a pump monitoring system according to an implementation described herein.

FIG. 2 is a diagram of pump monitoring system 110 according to an implementation described herein. As shown in FIG. 2, pump monitoring system 110 may include a chassis 210, a support plate 215, a monitoring device housing 220, a battery 230, a solar panel 240, a solar panel support 245, wheels 250, a bar 260, and a handle 270.

Chassis 210 may include a frame made from metal and/or another type of structural material, such as a structural plastic, composite, etc. As an example, chassis 210 may be manufactured from powder-coated steel. As another example, chassis 210 may be manufactured from stainless steel, galvanized steel, aluminum, and/or another type of metal. Chassis 210 may provide structural support and secure monitoring device housing 220, battery 230, and solar panel 240. Chassis 210 may be in the form of a cart structure with rectangular sides and may include diagonal support beams. The sides and/or diagonal support beams may be manufactured from structural tubing beams having a rectangular cross-section, H-profile beams, C-profile beams, L-profile beams, solid bar beams, and/or other types of beams.

Chassis 210 may include support plate 215 to support monitoring device housing 220 and battery 230. Support plate 215 may be manufactured from metal, structural plastic, structural composite, and/or another type of material. Chassis 210 may include wheels 250 and handle 270 to enable a person to move pump monitoring system 110 to and from a remote location. Bar 260 may raise the side of chassis 210 that is opposite wheels 250 so that chassis 210 is level and/or horizontal to the ground when not in motion. A user may tip pump monitoring system 110 backwards using handle 270 to lift bar 260 off the ground and enable wheels 250 to rotate when pushing pump monitoring system 110 to a desired location. Bar 260 may prevent pump monitoring system 110 from moving when chassis 210 is not tipped back and contacting the ground. Handle 270 may extend to a height so that pump monitoring system 110 may be comfortably pushed by a person of average height. In some implementations, the height of handle 270 may be adjustable (not shown in FIG. 2).

Wheels 250 may enable pump monitoring system 110 to be pushed over uneven ground. In some implementations, wheels 250 may include flat-free tires, such as tires made from a plastic or composite material that resists punctures. In other implementations, wheels 250 may include inflatable tires. Wheels 250 may be of sufficient diameter to enable pump monitoring system 110 to be easily moved over unpaved surfaces (e.g., at least 6 inches in diameter, etc.). Furthermore, in some implementations, wheels 250 may include additional features to ease movement over uneven terrain, such as knobby tires and/or shock suspensions (not shown in FIG. 2). Furthermore, in some implementations, pump monitoring system 110 may include four wheels rather what two wheels and bar 260, to facilitate moving pump monitoring system 110.

Monitoring device housing 220 may provide a dust-resistant and water-resistant enclosure to protect internal components of a pump monitoring device described further below. Monitoring device housing 220 may be manufactured from a structural plastic material, metal, composite, and/or another type of material. In some implementations, monitoring device housing 220 may meet one or more industrial standards for water-proof submersion. Monitoring device housing 220 is further described below with reference to FIG. 3.

Battery 230 may include a rechargeable battery, such as a 12 Volt rechargeable battery. Battery 230 may include a flooded lead-acid battery, a sealed valve regulated lead-acid (VRLA) battery, an absorbent glass mat (AGM) battery, a gel battery, a lithium-ion battery, a nickel-metal hydride battery, and/or another type of battery 230. Battery 230 may power the components of the pump monitoring device inside monitoring device housing 220 and be charged from solar panel 240 using a charging system included in the pump monitoring device.

Solar panel 240 may include a set of solar cells to capture sunlight and charge battery 230 and/or provide power to the pump monitoring device inside monitoring device housing 220 when the power supplied by battery 230 is insufficient to meet the power demand of the components of the pump monitoring device. Solar panel 240 may include monocrystalline solar cells, polycrystalline solar cells, thin film solar cells, and/or another type of solar cells. The type and/or size of solar panel 240 may be selected to meet the maximum power demand of the components of the pump monitoring device indefinitely or over long periods of time (e.g., days or weeks) if battery 230 fails. For example, in some implementations, solar panel 240 may have a capacity of 300 Watts (W) or more.

Solar panel support 245 may provide structural support to solar panel 240 and secure solar panel 240 to chassis 210. In some implementations, solar panel support 245 may be manufactured from the same type of beam as chassis 210. In other implementations, solar panel support 245 may be manufactured from a different type of structural material, such as, for example, perforated flat beams, square tubes, strut channels, L-shaped angles, etc. Solar panel support 245 may angle solar panel 240 with respect to the upper surface and/or base of chassis 210 to enable solar panel 240 to maximize the amount of sunlight solar panel 240 is able to receive.

In some implementations, solar panel support 245 may be positioned on chassis 210 in a position that protects solar panel 240 from impact if chassis 210 tips over. For example, solar panel support 245 may position solar panel 240 so that solar panel 240 is positioned back from the front of chassis 210 (i.e., the side with bar 260) so that solar panel 240 does not impact the ground if chassis 210 tips forward. Additionally, or alternatively, solar panel support 245 may position solar panel 240 so that solar panel 240 is recessed with respect to the sides of chassis 210 so that solar panel 240 does not impact the ground if chassis 210 falls sideways. Moreover, handle 270 may protect solar panel 240 by preventing solar panel 240 from impacting the ground if chassis 210 falls backwards.

The angle of solar panel support 245 with respect to chassis 210 may be fixed or adjustable. In some implementations, the angle of solar panel 240 may be fixed with respect to chassis (e.g., at 45 degrees, 30 degrees, etc.). In other implementations, solar panel support 245 may be adjustable so that the angle of solar panel 240 may be adjusted with respect to chassis 210 in order to position solar panel 240 to maximize the amount of sunlight absorbed by solar panel 240. Solar panel support 245 may be adjustable in one or more of x, y, and/or z planes and thus may have multiple degrees of freedom to tilt and rotate. Furthermore, in some implementations, solar panel support 245 may include a motor (not shown in FIG. 2) to adjust the angle of solar panel support 245. For example, a controller in the pump monitoring device may configured to use the motor to automatically adjust the angle of solar panel support 245 to track the position of the sun to maximize the amount of sunlight received by solar panel 240 during different times of the day.

Although FIG. 2 shows exemplary components of pump monitoring system 110, in other implementations, pump monitoring system 110 may include fewer components, different components, differently arranged components, or additional components than depicted in FIG. 2. Additionally, or alternatively, one or more components of pump monitoring system 110 may perform functions described as being performed by one or more other components of pump monitoring system 110.

Figure 3:
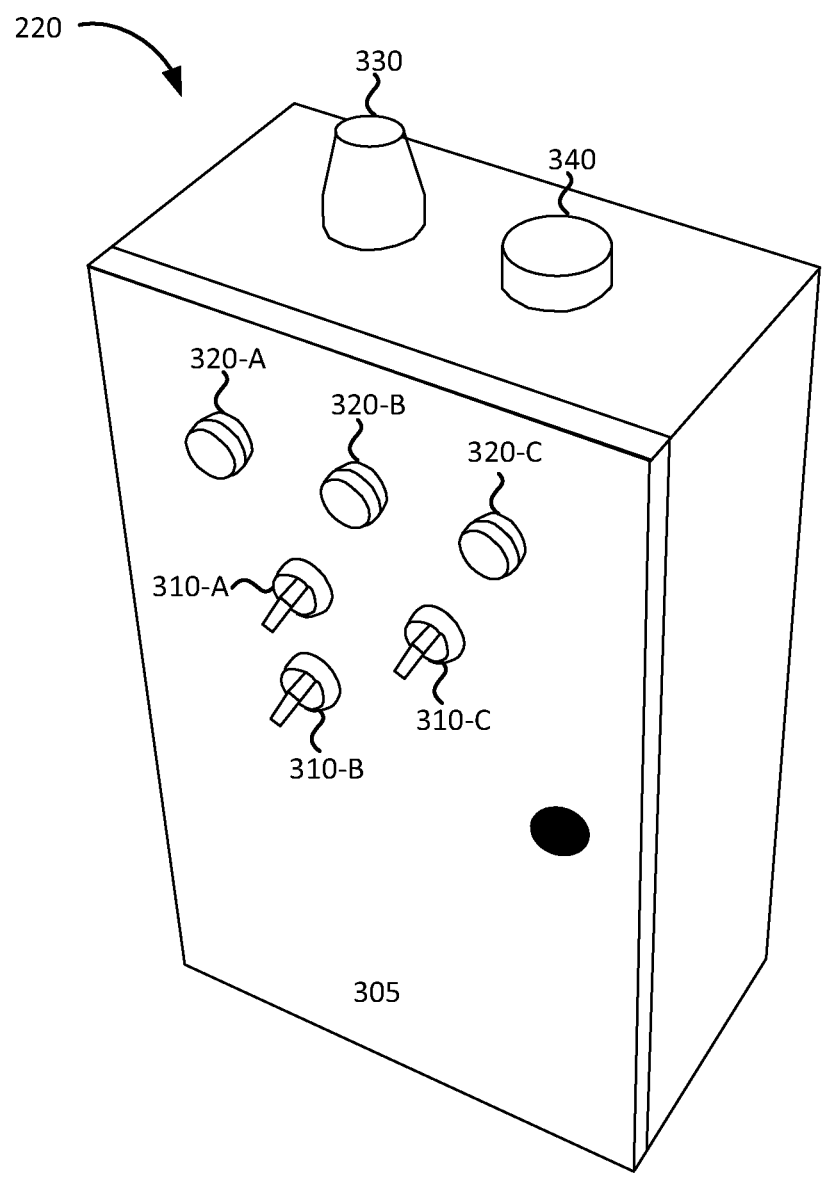
FIG. 3 is a diagram of a monitoring device housing according to an implementation described herein.

FIG. 3 is a diagram of monitoring device housing 220 according to an implementation described herein. As shown in FIG. 3, monitoring device housing 220 may include a front panel 305, a set of ports 310, a set of indicators 320, an antenna housing 330, and a GPS receiver housing 340.

Front panel 305 may provide access to the pump monitoring device inside monitoring device housing 220. Ports 310 A-C may include removable covers to provide access to connectors for attaching cables for connecting external sensors to the pump monitoring device. Thus, connections internal to monitoring device housing 220 may be accessed through ports 310 and used for wired connections for external sensors to be applied to pump equipment 120 or sensors installed in or on pump equipment 120. In some implementations, sensors need not use ports 310 and may connect wirelessly to pump monitoring device to report sensor data.

Indicators 320 A-C may provide indicator lights for components of pump monitoring system 110. For example, indicators 320 may include one or more light-emitting diodes (LEDs) indicating the status of particular components. As an example, a lit indicator light may indicate that a particular component is functioning correctly. As another example, a first color light (e.g., green) may indicate that the particular component is functioning correctly and a second color light (e.g., red) may indicate an error status or malfunction for the particular component. Indicators 320 may include an indicator for the pump monitoring device, an indicator for battery 230, an indicator for solar panel 240, etc. Additionally, indicators 230 may include an indicator for a controller of the pump monitoring device, an indicator for a transceiver of the pump monitoring device, an indicator for a charging system, an indicator for a particular sensor, etc. Antenna housing 330 may house a cellular wireless antenna. GPS receiver housing 340 may house a GPS receiver antenna.

Although FIG. 3 shows exemplary components of monitoring device housing 220, in other implementations, monitoring device housing 220 may include fewer components, different components, differently arranged components, or additional components than depicted in FIG. 3. Additionally, or alternatively, one or more components of monitoring device housing 220 may perform functions described as being performed by one or more other components of monitoring device housing 220. For example, while FIG. 3 illustrates three ports 310 A-C and three indicators 320 A-C for illustrative purposes, monitoring device housing 220 may include more, or fewer, number of ports 310 and/or indicators 320. Moreover, ports 310 and/or indicators 320 may be located on a different surface of monitoring device housing 220 rather than front panel 305.

Figure 4:
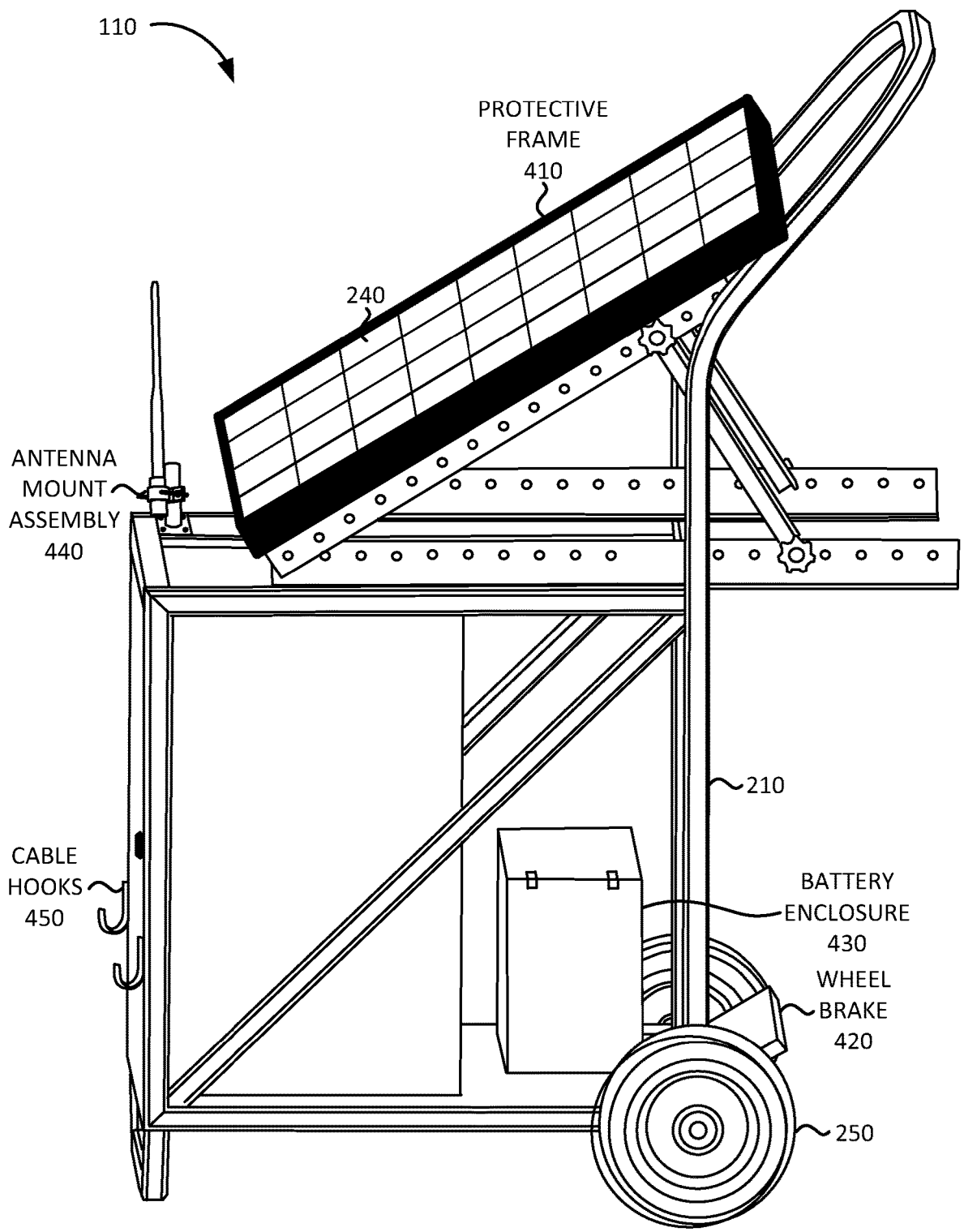
FIG. 4 is another diagram of a pump monitoring system according to an implementation described herein.

FIG. 4 is a second diagram of pump monitoring system 110 according to an implementation described herein. As shown in FIG. 4, in some implementations, pump monitoring system 110 may include features in addition to the features explained above with respect to FIG. 2. Thus, in addition to the features described above with respect to FIG. 2, pump monitoring system 110 may include a protective frame 410, a wheel brake 420, a battery enclosure 430, an antenna mount assembly 440, and/or cable hooks 450.

Protective frame 410 may enclose the sides of solar panel 240 and protect solar panel 240 from impact damage. Protective frame 410 may be manufactured from impact and/or shock absorbent plastic (e.g., thermoplastic polyurethane, neoprene, silicone, polystyrene, etc.) or a combination of shock absorbent plastic and rubber.

Wheel brake 420 may apply a brake to wheels 250 when engaged. For example, a user may apply pressure to wheel brake 420 with a foot to engage wheel brake 420 and apply a mechanism to prevent wheels 250 from turning. Battery enclosure 430 may provide a dust-resistant and water-spray resistant enclosure to protect battery 230. Battery enclosure 430 may be manufactured from a structural plastic material, metal, composite, and/or another type of material. In some implementations, battery enclosure 430 may meet one or more industrial standards for water-proof submersion.

Antenna mount assembly 440 may include hardware and/or fasteners for securing an antenna to chassis 210, such as a cellular wireless antenna for communicating with base station 130. Cable hooks 450 may be attached to chassis 210 to provide a support for cables from ports 310 to sensors on or in pump equipment 120.

Although FIG. 4 shows exemplary components of pump monitoring system 110, in other implementations, pump monitoring system 110 may include fewer components, different components, differently arranged components, or additional components than depicted in FIG. 4. Additionally, or alternatively, one or more components of pump monitoring system 110 may perform functions described as being performed by one or more other components of pump monitoring system 110.

Figure 5A:
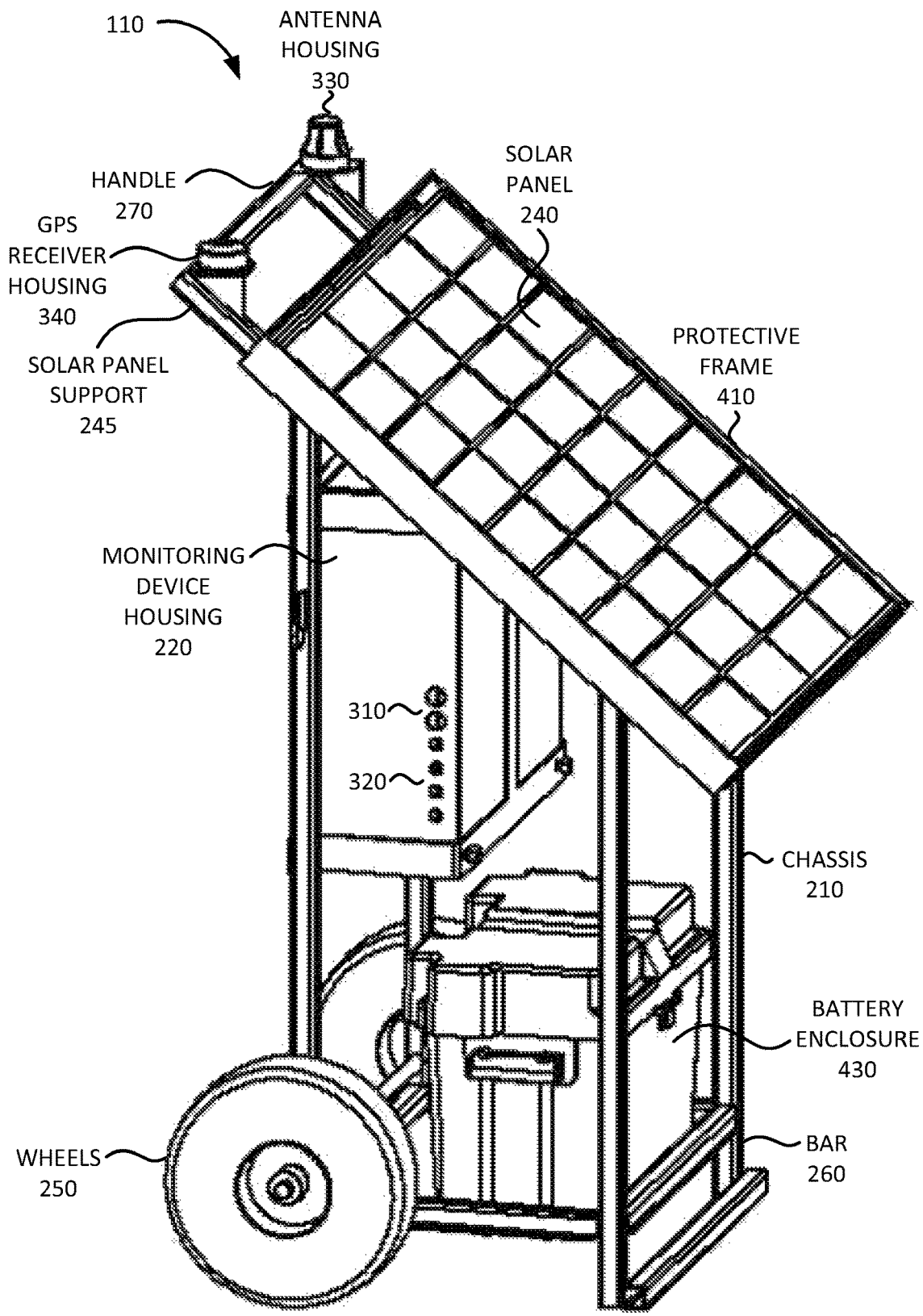
FIGS. 5A, 5B, and 5C are diagrams of another implementation of a pump monitoring system according to an implementation described herein.
Figure 5B:
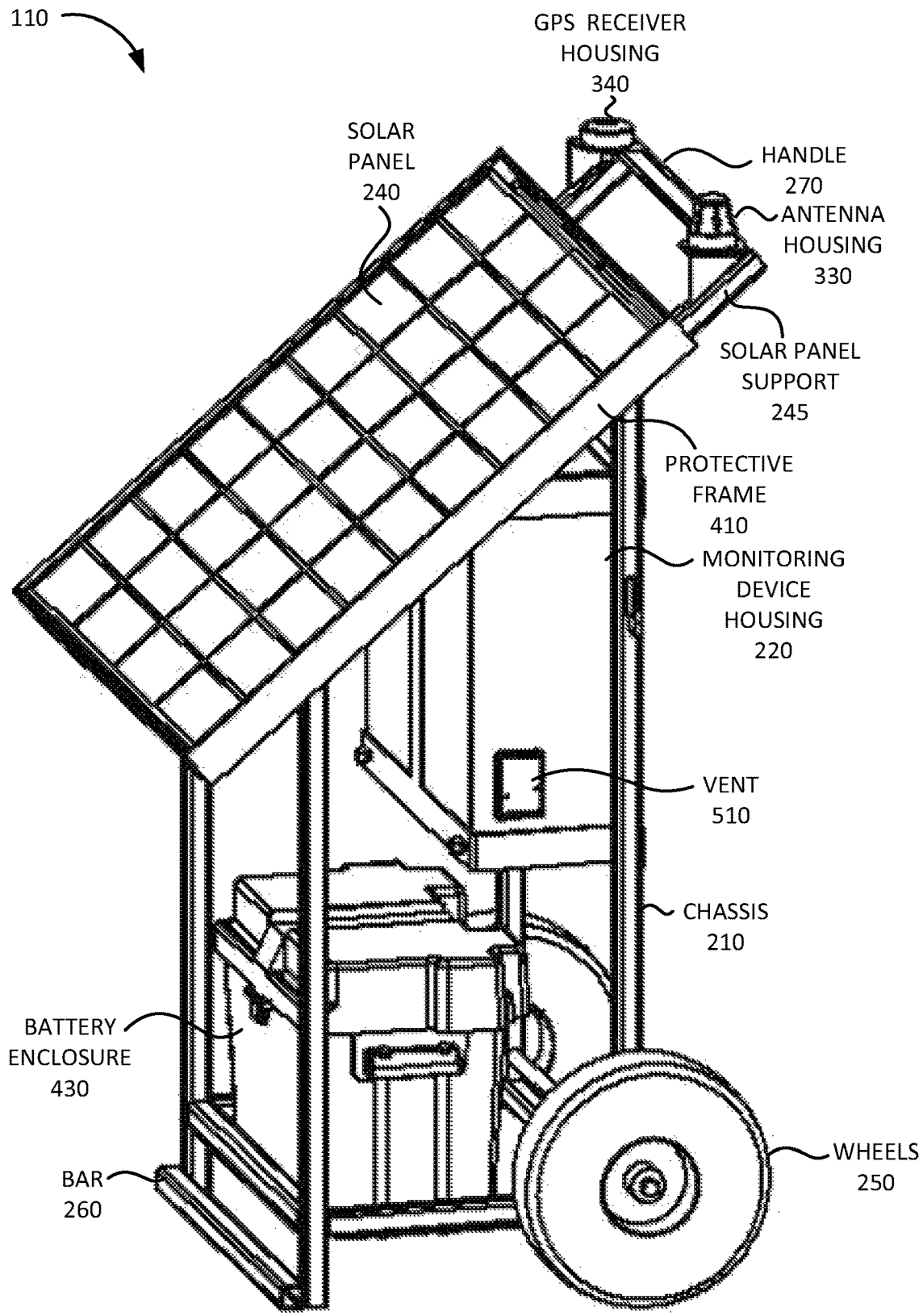
Figure 5C:
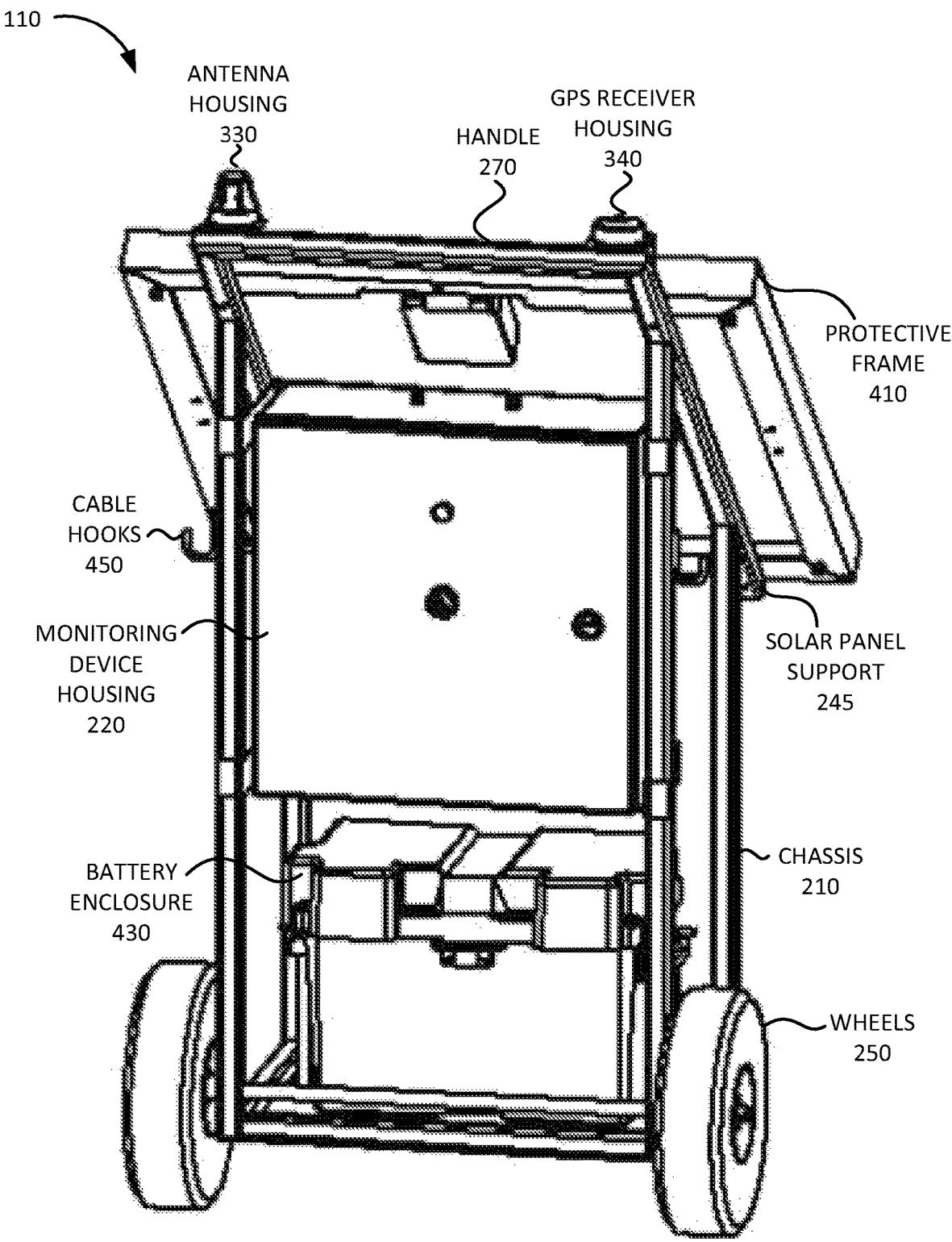

FIGS. 5A, 5B, and 5C are diagrams of another implementation of pump monitoring system 110 according to an implementation described herein. FIG. 5A illustrates a right-side view of pump monitoring system 110, FIG. 5B illustrates a left side view of pump monitoring system 110, and FIG. 5C illustrates a rear view of pump monitoring system 110. As shown in FIG. 5A, monitoring device housing 220 may be elevated above battery enclosure 430 to accommodate a larger battery enclosure 430. Furthermore, the elevated position of monitoring device housing 220 shown in FIGS. 5A, 5B, and 5C may facilitate connecting of wired connections for external sensors to be applied to pump equipment 120 as well as connecting wiring between battery 230, solar panel 240, and monitoring device housing 220 by a user located behind pump monitoring system 110. Additionally, the elevated position of monitoring device housing 220 may help protect the components inside monitoring device housing 220 in case of flooding.

As shown in FIG. 5A, ports 310 and/or indicators 320 may be located on a side panel of monitoring device housing 220 (e.g., a right side, etc.) and the other side of monitoring device housing 220 (e.g., the left side, etc.) may include a vent 510. Wire passthroughs for connecting battery 230 and/or solar panel 240 to the monitoring device inside monitoring device housing 220 may be located in the bottom panel of monitoring device housing 220 (not shown in FIGS. 5A, 5B, and 5C). Furthermore, antenna housing 330 and GPS receiver housing 340 may located in an elevated position on pump monitoring system 110 (e.g., on handle 270) to facilitate better wireless transmission and reception. Additionally, cable hooks 450 may be located at the rear of chassis 210.

Figure 6:
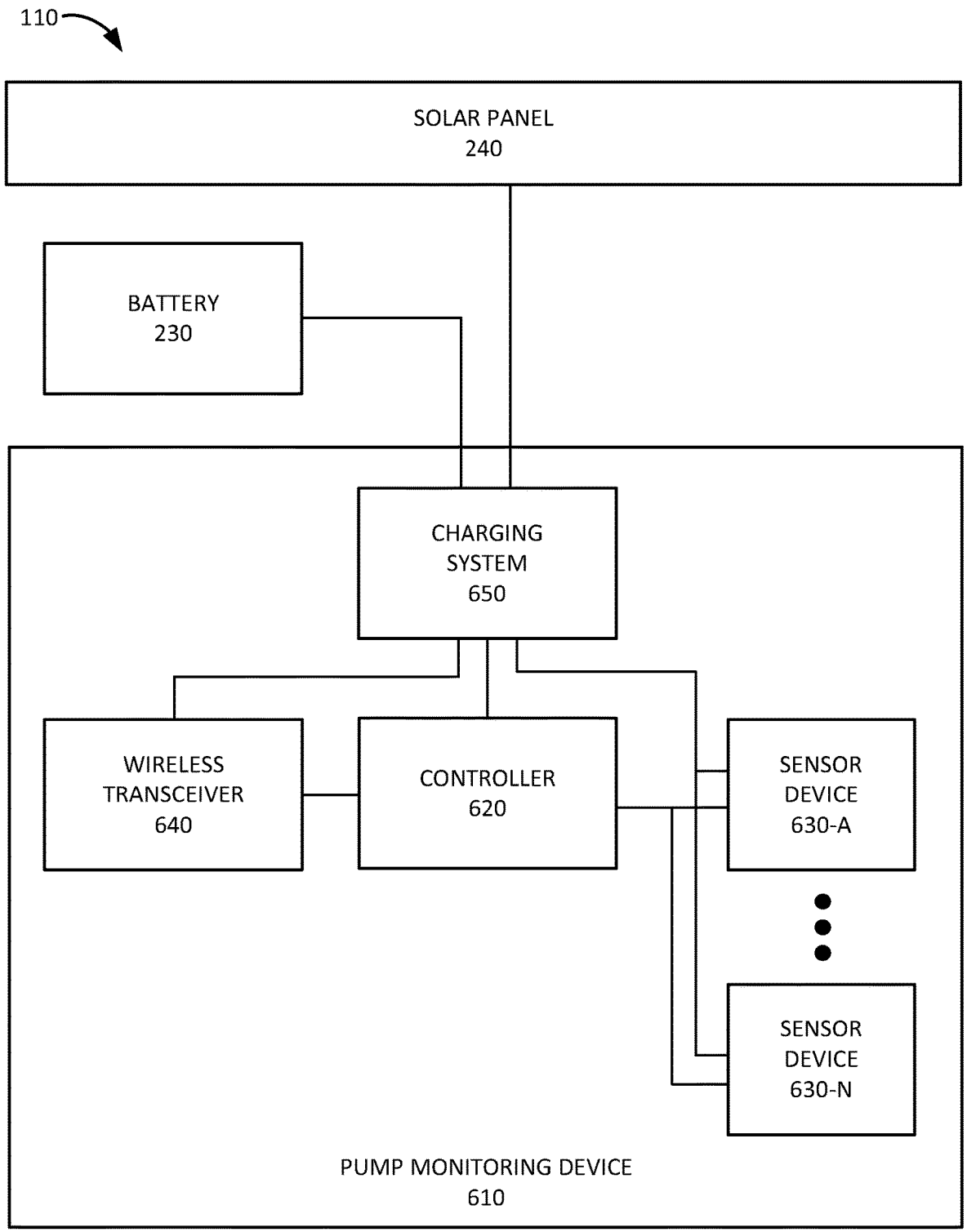
FIG. 6 is a diagram illustrating exemplary components of a pump monitoring system according to an implementation described herein.

FIG. 6 is a diagram illustrating exemplary components of pump monitoring system 110 according to an implementation described herein. As shown in FIG. 6, pump monitoring system 110 may include a pump monitoring device 610, battery 230, and solar panel 240. Pump monitoring device 610 may include a controller 620, a set of sensor devices 630-A to 630-N (referred to herein collectively as "sensor devices 630" and individually as "sensor device 630"), a wireless transceiver 640, and a charging system 650. According to an implementation, one or more of controller 620, sensor devices 630-A to 630-N, wireless transceiver 640, and/or charging system 650 may be installed on a printed circuit board, an etched wiring board, or a printed circuit assembly.

Controller 620 may control the operation of sensor devices 630, wireless transceiver 640, and/or charging system 650. Exemplary functional components of controller 620 are described below with reference to FIG. 7. Sensor device 630 may include a sensor device for monitoring pump equipment 120 or an interface and/or controller for interfacing with an external sensor device installed in or on pump equipment 120 or applied to pump equipment 120. For example, sensor devices 630 may include an interface connected to port 310 and port 310 may be coupled to wiring connected to an external sensor that is attached to pump equipment 120. Additionally, or alternatively, sensor device 630 may include a wireless transceiver, or use wireless transceiver 640 to establish a wireless connection with a sensor using a wireless personal area network (WPAN) communication method (e.g., based on the Institute of Electrical and Electronics Engineers (IEEE) 802.15 suite of standards, etc.).

Sensor device 630 may include, or interface with, a flow meter to measure a fluid volume and/or fluid mass passing through a particular location during a specified time period. As an example, a flow meter may be installed in a pipe and/or pump associated with pump equipment 120 and sensor device 630 may include an interface to connect to an output port associated with the flow meter. The installed flow meter may include a mechanical flow meter, a pressure flow meter, an optical flow meter, a vortex flow meter, a thermal mass flow meter, an ultrasonic flow meter, and/or another type of flow meter. As another example, a flow meter may include a mobile and non-intrusive flow meter associated with pump monitoring system 110 and connected to a controller in sensor device 630 via port 310, such as an ultrasonic flow meter, a sonar flow meter, and/or another type of mobile flow meter. A controller associated with sensor device 630 may be configurable to generate a particular ultrasound pulse profile to collect sensor data using the ultrasonic flow meter.

Sensor device 630 may interface with a fluid level meter. As an example, a fluid level meter may be installed in a pump, pipe, and/or storage tank associated with pump equipment 120 and sensor device 630 may include an interface and/or controller to connect to an output port associated with the fluid level meter. Sensor device 630 may include a controller configurable to adjust parameters associated with the fluid level meter, such as to adjust alert level thresholds.

Sensor device 630 may include, or interface with, a vibration sensor. A vibration sensor may include an accelerometer and/or another type of vibration sensor that may be attached to a particular surface of pump equipment 120 to measure vibration along two or three respective axes (e.g., x-, y-, and/or z-axes) and connected to a sensor interface and/or controller via a wired connection to port 310. The vibration data collected using the vibration sensor may be used, for example, to identify a rotational speed of pump equipment 120 and/or determine if pump equipment 20 is experiencing a problem. Sensor device 630 may include a signal amplifier, a signal filter, and/or a controller configurable to adjust parameters associated with the vibration sensor, signal amplifier, and/or signal filter, based on, for example, environmental conditions.

Sensor device 630 may include, or interface with, a temperature sensor. A temperature sensor may include a thermocouple and/or another type of temperature sensor that may be attached to pump equipment 120 to monitor the temperature of pump equipment 120. Sensor device 630 may include a controller configurable to adjust parameters associated with the temperature sensor, such as a temperature threshold based on, for example, environmental or other conditions.

Sensor device 630 may interface with a pressure sensor. As an example, a pressure sensor may be installed in a pump, pipe, and/or storage tank associated with pump equipment 120 and sensor device 630 may include an interface and/or controller to connect to an output port associated with the pressure sensor. Sensor device 630 may include a controller configurable to adjust parameters associated with the pressure sensor, such as, for example, a pressure threshold.

Wireless transceiver 640 may include a cellular radio transceiver, which may operate according to a cellular standard that enables communication with base station 130, such as the Third Generation Partnership Project (3GPP) Fourth Generation (4G) and/or Fifth Generation (5G) mobile wireless standards. Furthermore, wireless transceiver 640 may be configured for one or more M2M communications methods, such as eMTC, NB-IoT, etc. Additionally, wireless transceiver 640 may include a WPAN radio transceiver for a wireless personal area network (e.g., using IEEE 802.15 standards or Bluetooth®), a GPS receiver, and/or a radio transceiver operating in an unlicensed spectrum (e.g., 900 MHz, 2.4 GHz).

Charging system 650 may manage power usage of pump monitoring system 110. For example, charging system 650 may monitor the power capacity (e.g., voltage) of battery 230, power consumption of pump monitoring device 610, and/or power supplied by solar panel 240. Charging system 650 may be configured to use power from battery 230 to power pump monitoring device 610, when the battery power is above a battery power threshold, and use power from solar panel 240 to power pump monitoring device 610 and/or charge battery 230, when the battery is associated with a battery power below the battery power threshold. In some implementations, controller 620 may configure charging system 650 for a particular setting, such the battery power threshold, how much of available power from solar panel 240 to use to charge battery 230 and how much power to provide to pump monitoring device 610, etc.

Although FIG. 6 shows exemplary components of pump monitoring system 110, in other implementations, pump monitoring system 110 may include fewer components, different components, differently arranged components, or additional components than depicted in FIG. 6. Additionally, or alternatively, one or more components of pump monitoring system 110 may perform functions described as being performed by one or more other components of pump monitoring system 110.

Figure 7:
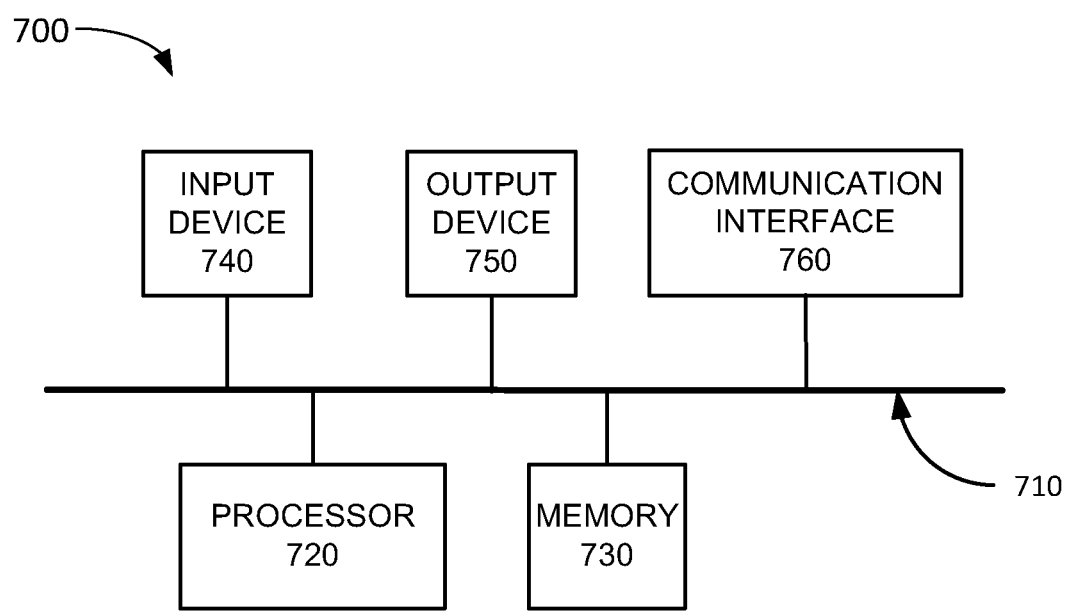
FIG. 7 is a diagram illustrating exemplary components of a device that may be included in a component of a pump monitoring system according to an implementation described herein.

FIG. 7 is a diagram illustrating exemplary components of a device 700 that may be included in a component of a pump monitoring system according to an implementation described herein. Controller 620, sensor device 630, wireless transceiver 640, charging system 650, user device 150, and/or application server 160 may each include one or more devices 700. As shown in FIG. 7, device 700 may include a bus 710, a processor 720, a memory 730, an input device 740, an output device 750, and a communication interface 760.

Bus 710 may include a path that permits communication among the components of device 700. Processor 720 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 720 may include an application-specific integrated circuit (ASIC), a field-programmable gate array (FPGA), application specific instruction-set processors (ASIPs), a system-on-chip (SoCs), and/or another type of integrated circuit or processing logic.

Memory 730 may include any type of dynamic storage device that may store information and/or instructions, for execution by processor 720, and/or any type of non-volatile storage device that may store information for use by processor 720. For example, memory 730 may include a random access memory (RAM), dynamic random access memory (DRAM), or another type of dynamic storage device, a read-only memory (ROM) device, a programmable read only memory (PROM), a static random access memory (SRAM), a single in-line memory module (SIMM), a dual in-line memory module (DIMM), a flash memory (e.g., a NAND flash, a NOR flash, etc.), or another type of static storage device, a content addressable memory (CAM), a magnetic and/or optical recording memory device and its corresponding drive (e.g., a hard disk drive, optical drive, etc.), and/or a removable form of memory, such as a flash memory. Alternatively, or additionally, memory 630 may include a Micro-Electromechanical System (MEMS)-based storage medium, and/or a nanotechnology-based storage medium.

Input device 740 may allow an operator to input information into device 700. Input device 740 may include, for example, a keyboard, a mouse, a pen, a microphone, a remote control, an audio capture device, an image and/or video capture device, a touch-screen display, and/or another type of input device. In some implementations, device 700 may be managed remotely and may not include input device 640. In other words, device 700 may be "headless" and may not include a keyboard, for example.

Output device 750 may output information to an operator of device 700. Output device 750 may include a display, a panel of indicator lights, a printer, a speaker, and/or another type of output device. For example, device 700 may include a display, which may include a liquid-crystal display (LCD) for displaying content to the user, a set of indicators 320, etc. In some implementations, device 700 may be managed remotely and may not include output device 750. In other words, device 700 may be "headless" and may not include a display, for example.

Communication interface 760 may include a transceiver that enables device 700 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 760 may include a transmitter that converts baseband signals to radio frequency (RF) signals and/or a receiver that converts RF signals to baseband signals. Communication interface 760 may be coupled to an antenna for transmitting and receiving RF signals.

Communication interface 760 may include a logical component that includes input and/or output ports, input and/or output systems, and/or other input and output components that facilitate the transmission of data to, and/or reception of data from, other devices. For example, communication interface 760 may include a network interface card (e.g., Ethernet card) for wired communications and/or a wireless network interface (e.g., a WiFi) card for wireless communications. Communication interface 760 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described in detail herein, device 700 may perform certain operations relating to, for example, configuring sensor devices 630 and/or collecting and reporting data collected by sensor devices 630. Device 700 may perform these operations in response to processor 720 executing software instructions contained in a computer-readable medium, such as memory 730. A computer-readable medium may be defined as a non-transitory memory device. A memory device may be implemented within a single physical memory device or spread across multiple physical memory devices. The software instructions may be read into memory 730 from another computer-readable medium or from another device. The software instructions contained in memory 730 may cause processor 720 to perform processes described herein. Alternatively, hardwired circuitry may be used in place of, or in combination with, software instructions to implement processes described herein. Thus, implementations described herein are not limited to any specific combination of hardware circuitry and software.

Although FIG. 7 shows exemplary components of device 700, in other implementations, device 700 may include fewer components, different components, additional components, or differently arranged components than depicted in FIG. 7. Additionally, or alternatively, one or more components of device 700 may perform one or more tasks described as being performed by one or more other components of device 700.

Figure 8:
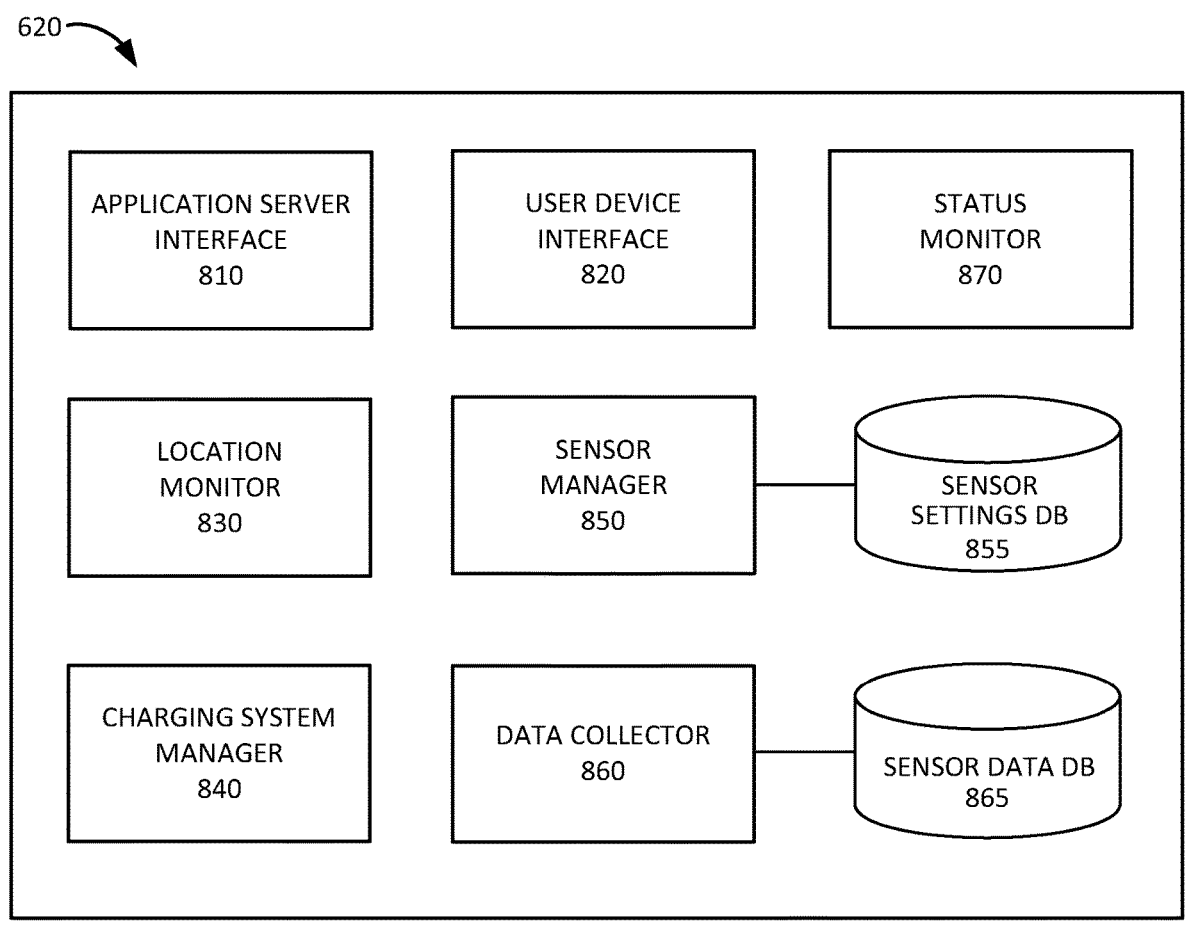
FIG. 8 is a diagram of exemplary functional components of the controller of a pump monitoring system according to an implementation described herein.

FIG. 8 is a diagram of exemplary functional components of controller 620 according to an exemplary implementation described herein. The functional components of controller 620 may be implemented, for example, via processor 720 executing instructions from memory 730. Alternatively, some or all of the functional components of controller 620 may be implemented via hard-wired circuitry. As shown in FIG. 8, controller 620 may include an application server interface 810, a user device interface 820, a location monitor 830, a charging system manager 840, a sensor manager 850, a sensor settings database (DB) 855, a data collector 860, a sensor data DB 865, and a status monitor 870.

Application server interface 810 may be configured to communicate with application server 160. For example, application server interface 810 may establish an Internet Protocol (IP) connection with application server 160 and receive a set of configuration selections or settings for sensor devices 630 and/or send collected sensor data to application server 160. User device interface 820 may be configured to communicate with client application 155 running on user device 150. For example, user device interface 820 may establish an IP connection with client application 155 and receive a set of configuration settings for sensor devices 630 and/or send collected sensor data to client application 155.

Location monitor 830 may monitor the location of pump monitoring system 110 using GPS information received from GPS satellite 170. Location monitor 830 may store and/or report the location of pump monitoring system 110 to application server 160 and/or user device 150. Charging system manager 840 may manage charging system 650. For example, charging system manager 840 may provide one or more settings to charging system 650 and/or receive information from charging system 650 that may be reported to client application 155 and/or application server 160, such as the power level of battery 230, the power being generated by solar panel 240, the power being consumed by pump monitoring device 610 and/or particular components of pump monitoring device 610, and/or other types of information.

Sensor manager 850 may manage sensor devices 630. For example, sensor manager 850 may receive one or more sensor configurations or settings and/or sensor data reporting configurations from client application 155 and/or application server 160, store the received configurations in sensor settings DB 855, and apply the stored configurations to sensor devices 630 and/or to data collector 860. The configurations may include, for example, which sensor devices 630 to activate, a calibration process to perform to ensure sensor devices 630 are performing properly and calibrated, a range of sensor values over which to gather sensor data, a threshold sensor value to generate an alert, a pulse generation parameter for generating a pulse to gather sensor data (e.g., for an ultrasonic flow sensor), a data sampling interval and/or frequency, a data reporting interval and/or frequency, and/or other types of configurations or settings.

Data collector 860 may collect sensor data using the activated sensor devices 630 based on a set of data collection configurations and store the collected sensor data in sensor data DB 865. Furthermore, data collector 860 may automatically report the collected sensor data to client application 155 and/or application server 160 based on a data reporting configuration.

Status monitor 870 may monitor the status of pump monitoring system 110 and send status reports to application server 160 and/or client application 155 at particular intervals and/or in response to detecting an alert condition. For example, status monitor 870 may report the status reported by indicators 320 and/or the status of various components of pump monitoring system 110, such as whether any error states or malfunctions have been detected. Furthermore, status monitor 870 may report which sensor devices 630 have been activated, which ports 310 are being used, how much capacity is being used by battery 230, how much power is being used by pump monitoring system 110 or by particular components of pump monitoring system 110, how much power solar panel 240 is generating, and/or other types of status information.

Figure 9:
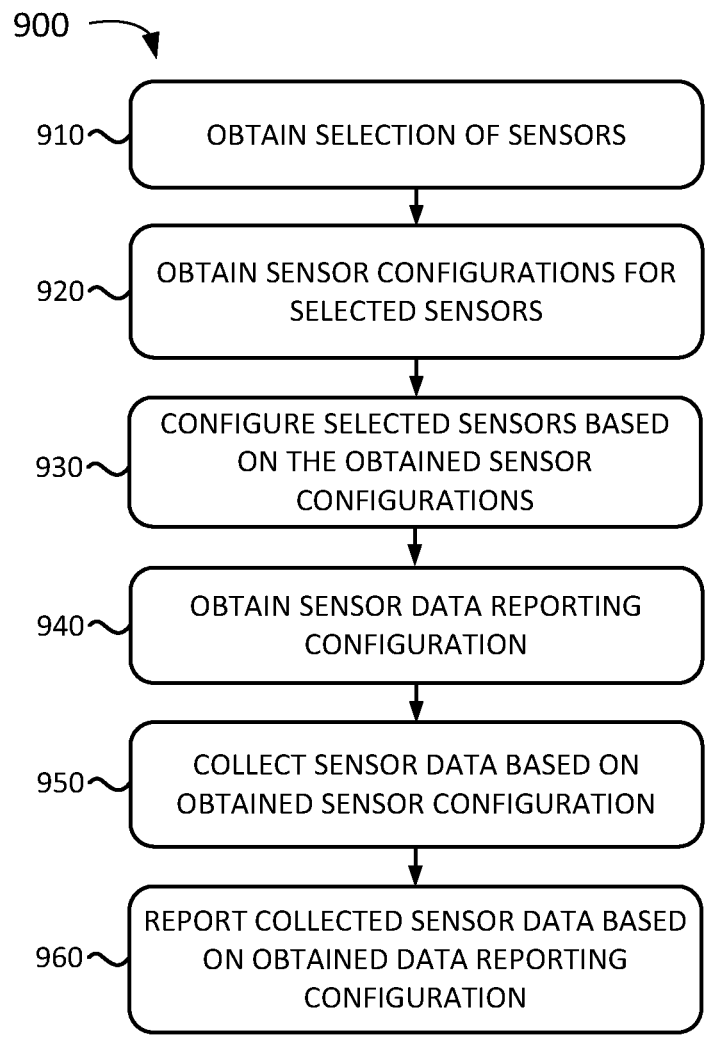
FIG. 9 is a flow diagram of a pump monitoring process according to an implementation described herein.

FIG. 9 is a flow diagram of a pump monitoring process according to an implementation described herein. In some implementations, process 900 of FIG. 9 may be performed by pump monitoring device 610. In other implementations, some or all of process 900 may be performed by another device or a group of devices separate from pump monitoring device 610.

As shown in FIG. 9, process 900 may include obtaining a selection of sensors (block 910), obtaining sensor configurations for the selected sensors (block 920), and configuring the selected sensors based on the obtained sensor configurations (block 930). For example, pump monitoring device 610 may attach to base station 130 using wireless transceiver 640. Furthermore, pump monitoring device 610 may be associated with a Uniform Resource Locator (URL), IP address, Mobile Directory Number (MDN), and/or another identifier that enables client application 155 and/or application server 160 to establish a connection with pump monitoring device 610 and send instructions to pump monitoring device 510.

Pump monitoring device 610 may receive a selection of sensor devices 630 to activate and a set of configurations for particular sensor devices 630 that have been activated. Pump monitoring device 610 may apply the configuration settings to sensor devices 630. The configurations may include, for example, a calibration process to perform, a range of sensor values over which to gather sensor data, one or more threshold sensor values to generate an alert, a pulse generation parameter for generating a pulse to gather sensor data (e.g., for an ultrasonic flow sensor), a data sampling interval and/or frequency of measuring or monitoring, and/or other types sensor configuration parameters values.

In some implementations, sensor settings for sensor devices 630, and/or transmission settings for wireless transceiver 640, may depend on whether power is being provided by battery 230 or solar panel 240. As an example, sensor manager 850 may select a configuration with fewer features and less power consumption if the capacity of battery 230 is below a threshold or if power is being consumed from solar panel 240, such as select a lower sampling frequency, a lower sensor data reporting frequency, etc. As another example, sensor manager 850 may select a higher threshold for sending an alert if the capacity of battery 230 is below a threshold or if power is being consumed from solar panel 240.

Process 900 may further include obtaining a sensor data reporting configuration (block 940), collect sensor data based on the obtained sensor configuration (block 950), and report the collected sensor data based on the obtained sensor data reporting configuration (block 960). For example, pump monitoring device 610 may receive a data sampling interval and/or frequency of monitoring, a data reporting interval and/or frequency, a URL or other identifier for reporting the collected sensor data, parameters to include in the reported sensor data (e.g., the location of pump monitoring system 110, an identifier associate with pump equipment 120, etc.), conditions for reporting an alert based on a particular threshold, and/or other types of sensor data reporting configurations.

Data collector 860 may collect and report sensor data based on the received sensor data reporting configurations. As an example, data collector 860 may upload collected sensor data values to a URL to application server 160, user device 150, and/or other devices, at particular intervals. As another example, data collector 860 may set a threshold sensor value for sensor device 630, detect that the threshold sensor value has been reached or exceeded by a collected sensor value, generate an alert based on the detected sensor value, and transmit the alert to the data reporting URL (or to an alert URL different from the data reporting URL, application server 160, user device 150, etc.) via base station 130. Furthermore, in addition to reporting collected sensor data, status monitor 870 may report a status of pump monitoring system 110 at particular intervals or in response to a detected alert condition.

While implementations described herein refer to monitoring pump equipment, pump monitoring system 110 may be used, in other implementations, to monitor other types of systems in remote locations that may be monitored with a set of sensors, such as, for example, Industrial IoT (IIoT) devices or systems, drill equipment, mining equipment, power generating stations, weather stations, and/or other types of remote machinery or monitoring devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. The use of the term or phrase "embodiment" or "embodiments" does not necessarily refer to all embodiments described, nor does it necessarily refer to the same embodiment, nor are separate or alternative embodiments necessarily mutually exclusive of other embodiment(s). The same applies to the term "implementation," "implementations," etc.

For example, while a series of blocks have been described with respect to FIG. 9, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A device for monitoring pump equipment, comprising:
   a pump monitoring device comprising:
      a plurality of interface devices configured to interface with a plurality of sensor devices located on or in the pump equipment, wherein the pump equipment is external to the device for monitoring the pump equipment, and wherein the plurality of interface devices includes at least one interface device configured to interface with a pump sensor that monitors the pump equipment;
      a controller configured to configure the plurality of sensor devices and collect sensor data from the plurality of sensor devices; and
      a wireless transceiver configured to communicate with a cellular base station;
   a battery configured to provide power to the pump monitoring device;
   a solar panel;
   a charging system to charge the battery using the solar panel;
   a waterproof housing that encloses the pump monitoring device and the charging system, wherein the waterproof housing includes a plurality of ports coupled to the plurality of interface devices, and wherein the controller is to configure the plurality of sensor devices located on or in the pump equipment via the plurality of interface devices and the plurality of ports; and
   a chassis configured to secure the pump monitoring device, battery, solar panel, and charging system into a self-contained mobile monitoring device,
   wherein the wireless transceiver is coupled to an upper surface of the chassis, and
   wherein the solar panel is coupled to the upper surface of the chassis.

2. The device of claim 1, wherein the controller is further configured to:
   obtain a sensor configuration for particular ones of the plurality of sensor devices;
   configure the particular ones of the plurality of sensor devices based on the obtained sensor configuration;
   collect sensor data based on the obtained sensor configuration; and
   report the collected sensor data via the wireless transceiver.

3. The device of claim 2, wherein the sensor configuration for a sensor device of the plurality of sensor devices includes at least one of:
   a calibration process to perform;
   a range of sensor values over which to gather sensor data;
   a threshold sensor value to generate an alert; or
   a pulse generation parameter for generating a pulse to gather sensor data.

4. The device of claim 2, wherein the controller is further configured to:
   set a threshold sensor value for a sensor device of the plurality of sensor devices;
   detect the threshold sensor value in data collected from the sensor device;
   generate an alert based on the detected threshold sensor value; and
   transmit the generated alert to an application server using the wireless transceiver.

5. The device of claim 1, wherein the plurality of interface devices includes an interface device configured to interface with at least one of:
a flow meter;
a fluid level meter;
a vibration sensor;
a temperature sensor; or
a pressure sensor.

6. The device of claim 1, wherein the solar panel is secured to the chassis in a position that protects the solar panel from impact if the chassis tips over.

7. The device of claim 1, further comprising:
a pair of wheels at a first side of the chassis; and
a bar at a second side of the chassis to keep the chassis level.

8. The device of claim 7, further comprising:
a foot brake configured to engage the pair of wheels.

9. The device of claim 1, further comprising:
a protective frame around the solar panel.

10. The device of claim 1, further comprising:
a mounting assembly for an antenna for the wireless transceiver.

11. The device of claim 1, further comprising:
at least one cable hook.

12. The device of claim 1, further comprising:
a support for the solar panel, wherein the support is configured to adjust an angle of the solar panel with respect to a base of the chassis.

13. The device of claim 1, wherein the waterproof housing meets an industrial standard for waterproof submersion.

14. The device of claim 1, further comprising:
a waterproof battery enclosure that encloses the battery.

15. The device of claim 14, wherein the waterproof housing is elevated above the waterproof battery enclosure.

16. The device of claim 1, further comprising:
an antenna connected to the pump monitoring device; and
an antenna housing enclosing the antenna.

17. The device of claim 1, further comprising:
a Global Positioning System (GPS) receiver connected to the pump monitoring device; and
a GPS receiver housing enclosing the GPS receiver.

* * * * *